United States Patent
Blumenthal et al.

(10) Patent No.: US 9,407,426 B2
(45) Date of Patent: Aug. 2, 2016

(54) OPTICAL NETWORK INTERFACE, MODULE AND ENGINE

(75) Inventors: Daniel J. Blumenthal, Santa Barbara, CA (US); Henrik N. Poulsen, Santa Barbara, CA (US)

(73) Assignee: OE SOLUTIONS AMERICA, INC., Englewood Cliffs, NJ (US)

( * ) Notice: Subject to any disclaimer, the term of this patent is extended or adjusted under 35 U.S.C. 154(b) by 416 days.

(21) Appl. No.: 12/945,470

(22) Filed: Nov. 12, 2010

(65) Prior Publication Data

US 2011/0116792 A1 May 19, 2011

Related U.S. Application Data

(60) Provisional application No. 61/281,157, filed on Nov. 12, 2009, provisional application No. 61/281,156, filed on Nov. 12, 2009.

(51) Int. Cl.
| | |
|---|---|
| *H04B 10/40* | (2013.01) |
| *H04L 7/00* | (2006.01) |
| *H04B 10/80* | (2013.01) |
| *H04L 7/027* | (2006.01) |
| *H04B 10/079* | (2013.01) |
| *H04L 29/06* | (2006.01) |

(52) U.S. Cl.
CPC ............. *H04L 7/0075* (2013.01); *H04B 10/40* (2013.01); *H04B 10/801* (2013.01); *H04L 7/027* (2013.01); *H04B 10/0793* (2013.01); *H04L 7/0083* (2013.01); *H04L 65/1069* (2013.01)

(58) Field of Classification Search
CPC ..................................................... H04B 10/40
USPC .................................................. 370/463, 438
See application file for complete search history.

(56) References Cited

U.S. PATENT DOCUMENTS

| | | | |
|---|---|---|---|
| 7,090,509 B1* | 8/2006 | Gilliland et al. | 439/76.1 |
| 7,373,084 B2* | 5/2008 | Yun | H04B 10/40 370/351 |
| 7,529,485 B2 | 5/2009 | Farmer et al. | |
| 7,664,401 B2 | 2/2010 | Nelson et al. | |
| 7,751,717 B2* | 7/2010 | Hahin et al. | 398/135 |
| 7,918,611 B2 | 4/2011 | Hudgins et al. | |
| 8,769,082 B2* | 7/2014 | Powell | G06F 1/3209 370/463 |
| 2001/0027688 A1* | 10/2001 | Yamanaka | 73/865.6 |
| 2001/0030971 A1* | 10/2001 | Moody | H04B 10/801 370/401 |
| 2002/0027688 A1* | 3/2002 | Stephenson | 359/152 |
| 2002/0027689 A1* | 3/2002 | Bartur et al. | 359/152 |
| 2003/0048748 A1* | 3/2003 | Semaan | H04J 3/085 370/225 |
| 2003/0048801 A1* | 3/2003 | Sala | H04B 10/272 370/445 |
| 2004/0091268 A1 | 5/2004 | Hogan et al. | |

(Continued)

FOREIGN PATENT DOCUMENTS

| | | |
|---|---|---|
| CN | 101365250 A | 2/2009 |
| CN | 101697601 A | 4/2010 |

*Primary Examiner* — Andrew Lai
*Assistant Examiner* — Andrew C Lee
(74) *Attorney, Agent, or Firm* — Karish & Bjorgum, PC; Kristin C. Hiibner

(57) ABSTRACT

An optical network interface (ONI) module has two main components: an optoelectronic front-end and a general purpose hardware-programmable optical network interface engine. The ONI engine is hardware programmable, allowing the user to configure the overall ONI module with different optoelectronic front-ends and for use with different host modules. In this way, the ONI module can be configured for different applications and protocols.

28 Claims, 2 Drawing Sheets

(56) References Cited

U.S. PATENT DOCUMENTS

| | | |
|---|---|---|
| 2004/0208514 A1 | 10/2004 | Zhang et al. |
| 2006/0133411 A1* | 6/2006 | Denton .................. H04L 29/06 370/463 |
| 2007/0086479 A1* | 4/2007 | Ling ....................... H04L 49/90 370/463 |
| 2007/0140288 A1* | 6/2007 | Boyd ................. H04Q 11/0067 370/442 |
| 2007/0153823 A1* | 7/2007 | Wojtowicz ............. H04B 10/40 370/463 |
| 2008/0187316 A1 | 8/2008 | Dallesasse et al. |
| 2008/0292311 A1 | 11/2008 | Daghighian et al. |
| 2008/0292322 A1 | 11/2008 | Daghighian et al. |
| 2009/0028548 A1* | 1/2009 | Tamura ................ H04L 49/602 398/2 |
| 2009/0060531 A1* | 3/2009 | Biegert et al. ................ 398/214 |
| 2010/0158525 A1 | 6/2010 | Walter |
| 2011/0116810 A1 | 5/2011 | Poulsen et al. |
| 2011/0150475 A1* | 6/2011 | Soto et al. ........................ 398/63 |
| 2011/0229131 A1 | 9/2011 | Izenberg et al. |
| 2012/0027415 A1 | 2/2012 | Chan et al. |
| 2012/0301135 A1 | 11/2012 | Tse-Au |
| 2012/0308239 A1 | 12/2012 | Sheth et al. |

* cited by examiner

OPTICAL NETWORK INTERFACE, MODULE AND ENGINE

CROSS-REFERENCE TO RELATED APPLICATION(S)

This application claims priority under 35 U.S.C. §119(e) to U.S. Provisional Patent Application Ser. No. 61/281,157, "Optical Burst Mode Clock and Data Recovery Method and Apparatus for Optical Transceivers," filed Nov. 12, 2009 and to U.S. Provisional Patent Application Ser. No. 61/281,156, "Burst Mode Optical Transceivers with Embedded Electronic Application Specific Circuits (Asics) and Application Specific Optics," filed Nov. 12, 2009. The subject matter of all of the foregoing is incorporated herein by reference in their entirety.

BACKGROUND OF THE INVENTION

1. Field of the Invention

This invention relates generally to fiber optic transceivers and transponders, and in particular to the use of an optical network interface engine that is hardware programmable to be used with different application-specific optoelectronic front-ends and/or different host modules and transport protocols.

2. Description of the Related Art

Today's fiber optic based networks use optical transceivers (and transponders) between host electronics and the optical signals that propagate on the optical fiber. A transceiver contains the basic elements of an optical transmitter, an optical receiver, and other electronics to perform physical (PHY) layer protocol functions as well as functions to control these components. There are many applications for transceivers ranging from fiber to the home to data centers to long haul and high-performance communications, with each application imposing its own requirements. Today, transceivers are usually manufactured in a form factor called a pluggable like an XFP or SFP package, or as a board mountable component.

The performance and design of the transceiver as well as its cost is customized for the particular application. For example, if a transceiver is designed for one of today's framed transport protocols (e.g. SONET, SDH, FDDI, Gigabit Ethernet), the clock and data recovery elements in the transceiver will be designed based on continuous data flow rather than burst mode or unframed packet modes of transmission and reception. The receiver typically operates at either a fixed standardized bit rate or is selectable over a limited set of standardized bit rates specified by the protocol. Electronics and optics in the transceiver are also customized to the transport protocol and application.

For example, the optical transmitter within a transceiver includes optics that launches an optical signal onto the fiber. This optics varies depending on the application. For low-cost applications, ultra low cost lasers operating at 1310 nm or 830 nm with the capability to transmit over very short distances (typically less than 2 km) are commonly used. These lasers are often driven by the direct drive method where current from an electronic driver circuit is applied directly to the laser. In contrast, at longer distances at higher bit rates, more complex optics involving a higher performance laser and possibly an external optical modulator and optical amplifier may be used, as well as chirp and dispersion compensation techniques.

Today's state of the art in high performance transceivers must meet the needs of today's networks, including low cost, reliability and sparing (stocking of spare parts) and preferably also the needs of future networks including tenability, rapid reconfiguration, power efficiency and ability to be controlled in power efficient environments, and burst mode environments. The number of spare receivers kept on site in case of failure in a WDM network should be kept to a minimum in order to reduce the cost of operating a network. Today's WDM transceivers that operate in the 15xxnm and 16xxnm wavebands use either fixed channel lasers that adhere to the ITU frequency grid standard for dense WDM (DWDM) or coarse WDM (CWDM). However, in order to require only one laser, many transceivers today are moving to using a wavelength tunable laser that can cover either the C or L bands or both.

Another aspect of today's transceivers are the electronics that are used to drive the optics, to convert electronic signals between analog and digital forms, to acquire clock and data, and also microprocessors and I/O channels for controlling the transceivers. These circuits today consist of multiple dedicated chips to handle these functions. These chip sets and the auxiliary chips to operate between the transceiver and other external subsystems add to the expense for any one application. Since these components are typically customized for an application, the number of spare parts multiplies with the number of applications and transceiver types. There is typically also a mixture of chips used for digital only and digital/analog functions, thus adding to the complexity and cost of the transceiver. Typically, a different transceiver is required for each transport protocol or finite set of transport protocols such that a sparing card in a multi-service platform (one that supports communications across a wide variety of transport protocols) will require sparing of more than one type of transceiver depending on the services it supports.

Thus, different transceivers typically utilize different components (both optics and electronics) customized for a particular application and/or protocol. To switch protocols, the transceiver must be changed. More advanced transceivers may include different physical sections designed for different protocols, thus allowing the transceiver to be used with multiple protocols. These sections may be on multiple chips or a custom circuit like an ASIC. However, the set of possible protocols is fixed once the transceiver is manufactured and the protocol sections in the hardware are dedicated to each protocol. The transceiver typically cannot be programmed later by the user to implement a new or different protocol or interface to new or different optics.

Thus, there is a need for transceiver architectures that can provide more flexibility in supporting different protocols, host electronics and/or optoelectronic front-ends.

SUMMARY OF THE INVENTION

Embodiments of the invention overcome various limitations of the prior art by providing an optical network interface (ONI) module with two main components: an optoelectronic front-end and a general purpose hardware-programmable optical network interface engine. The ONI engine is hardware programmable, allowing the user to configure the overall ONI module with different optoelectronic front-ends and for use with different host modules. In this way, the ONI module can be configured for different applications, protocols, signaling and framing, as well as possibly operation as a burst mode component.

The interface between the programmable ONI engine and the optoelectronic front-end allows the ONI engine to be used with different types of front-ends, including those that contain communication of both digital and analog signals. Similarly, the programmable ONI engine has an interface on the host module side that allows the ONI engine to be used with different types of host modules, which typically are digital. In this way, a single hardware programmable optical network interface engine can be used with different front-ends and host modules and to support different transport protocols and applications. An ONI engine can be used in transmitters, receivers, transceivers and/or transponders. One advantage of having a common engine that addresses many applications across a wide variety of markets is that manufacturing volumes can be high, thus driving down the cost.

In one embodiment, the programmable optical network interface engine supports burst mode transmission. This adds flexibility to the types of protocols and applications that can be supported since synchronous transmission is not required.

Other aspects of the invention include methods corresponding to the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
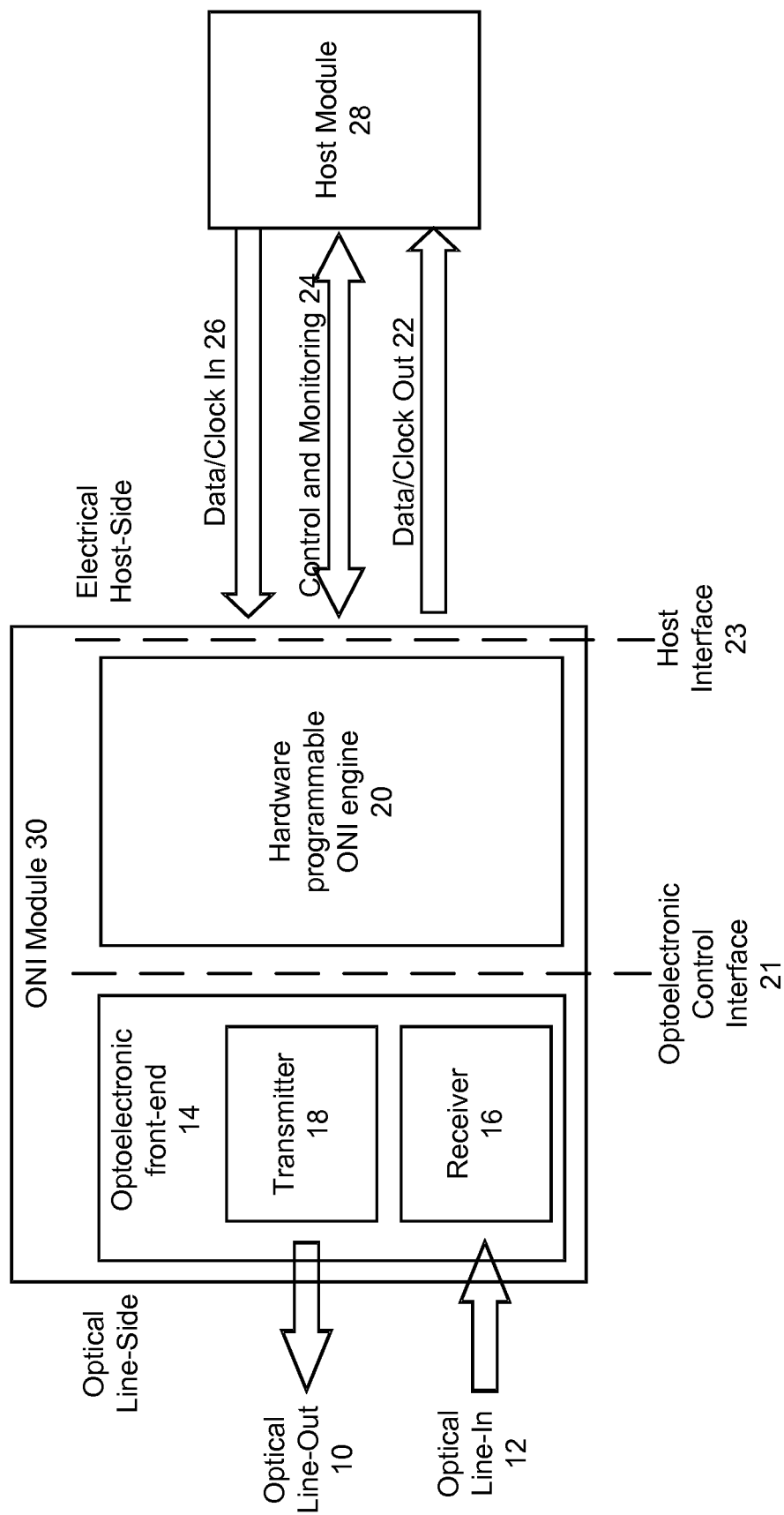
FIG. 1 is an architecture diagram of the present invention.

FIG. 1 is an architecture diagram of the present invention. The optical network interface module 30 includes an optoelectronic front-end 14 and a hardware programmable optical network interface engine 20. The optoelectronic front-end 14 includes a transmitter 18 and a receiver 16. The transmitter 18 and receiver 16 communicate with the optical data input 12 and optical data output 10 (i.e., the optical line-side). The ONI engine 20 implements physical (PHY) layer functions and, depending on the design, may also implement higher layer functions. The receive data path is from optical line-in 12 through receiver 16 and ONI engine 20 to electrical data-out 22. The transmit data path is from electrical data-in 26 through ONI engine 20 and transmitter 18 to optical line-out 10.

The ONI engine 20 interfaces to the optoelectronic front-end 14 on one side, and to host module 28 on the other side. The ONI engine 20 typically is implemented as a chip or chip set with associated firmware/software. It can be based on one or more semiconductor substrates, non-semiconductor substrates or photonic integrated circuits where multiple optical, optoelectronic and/or electronic components are integrated on a common semiconductor substrate or other type of common substrate. Other implementations are possible. The interface to the optoelectronic front-end 14 will be referred to as the optoelectronic control interface 21. The interface to the host module 28 will be referred to as the host interface 23. So the ONI engine 20 connects to the optoelectronic front-end 14 via the optoelectronic control interface 21, and connects to the host module 28 via the host interface 23. These interfaces and the programmable optical network interface engine 20 are designed so that the same ONI engine 20 can be used with different front-ends 14 and host modules 28. In the following examples, the host interface 23 is electrical, but it can be optical or a combination of optical and electrical in alternate embodiments.

The ONI engine 20 is hardware programmable, analogous to FPGAs where FPGAs are broadly used in today's electronics applications due to their rapid improvement in performance and speed. The ONI engine contains basic components that can be used for different types of front-ends 14 and host modules 28. For example, it may contain current drivers for different types of optical modulators, lasers or light sources. Once the type of optical modulator, laser or light source is specified in the front-end 14, the ONI engine 20 is hardware programmed to connect the corresponding current drivers to the modulator, laser or light source. As another example, the ONI engine 20 may contain an FPGA section. Once the transport protocol for the host module 28 is specified, the FPGA section may be hardware programmed to implement the corresponding functionality for that protocol and possibly also other signaling, management, control plane and other functions used in networking.

One advantage of this approach is that a single hardware programmable ONI engine 20 can be used to support different transport protocols. By leveraging the larger volume across a broad number of application markets, the cost of the chip/chip set can be reduced. This can be used to enable low cost optical network interface modules that can not only support today's legacy protocols, but also possibly implement new protocols.

For example, in one implementation, the ONI engine 20 includes functionality to support burst mode and unframed transmissions. This capability can help to move today's protocols towards burst mode and asynchronous operation with real time clock and data acquisition without prior constraints of how the data itself is transported. This type of implementation provides a unified optical transponder interface that can be programmed to work in framed or bursty traffic environments and that provides a single interface 21 for sparing applications.

Figure 2:
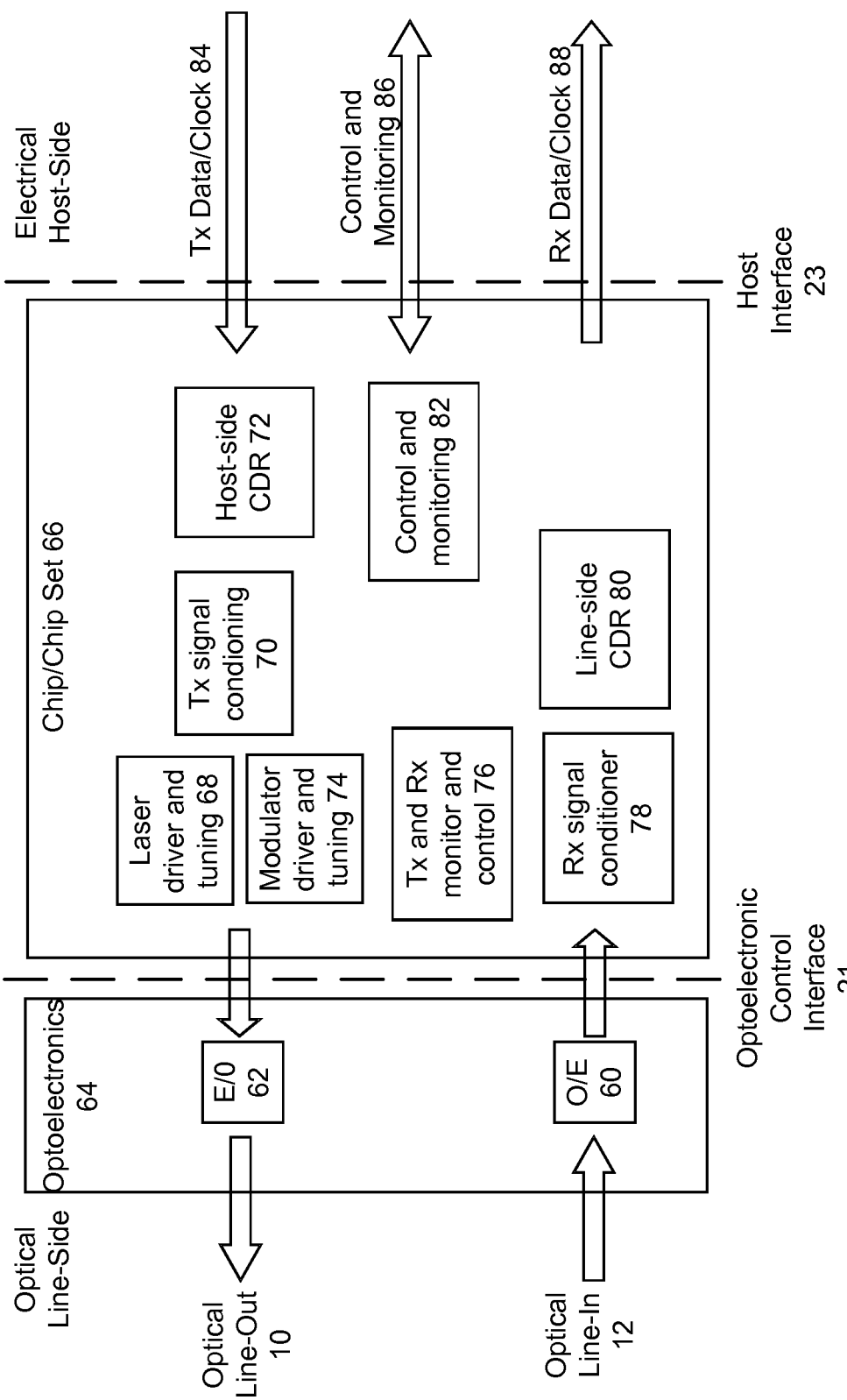
FIG. 2 is a block diagram of an example ONI module based on the architecture shown in FIG. 1.

FIG. 2 is a block diagram of an example optical network interface module based on the architecture shown in FIG. 1. The optoelectronic front-end 64 includes an E/O converter 62 and an O/E converter 60. The E/O converter 62 may include elements such as lasers, modulators, optical amplifiers, dispersion pre-compensation devices, combiners, splitters, frequency selective multiplexers/demultiplexers, optical filters, voltage controlled attenuators, etc. Similarly, the O/E converter 60 may include elements such as photodetectors, transimpedance amplifiers, optical amplifiers, dispersion compensation devices, combiners, splitters, frequency selective multiplexers/demultiplexers, optical filters, voltage controlled attenuators, etc. Optics to interface with the fiber optic channel typically will also be part of the optoelectronic front-end 64. The specific choice of components and their design will depend on the specific transport protocol and application. Examples of different applications include fiber to the home (ONT and OLT), data-center, metro, long haul, ultra long haul, WAN/MAN and very short reach and avionics.

Examples of optical network interface modules that can be implemented using this architecture include but are not limited to tunable wavelength transmitters, burst mode transmitters and receivers, low cost short reach transmitters and receivers, fixed wavelength medium, long and ultra long range optical network interface modules, transponders that are used to connect different input and output wavelengths or transmission systems, transponders used for data regeneration, transponders used in add/drop multiplexing systems, and transponders used to convert either optical wavelength or protocol or framing format by interacting with the host module.

Since many different types of front-ends 64 can be used with the common ONI engine 66, both the ONI engine 66 and the interface 21 are designed to have sufficient functionality and flexibility to accommodate the intended range of possible optoelectronic front-ends 64. Similarly, the ONI engine 66 and the host interface 23 are designed to have sufficient functionality and flexibility to accommodate the intended range of possible transport protocols and host modules 28.

In the example of FIG. 2, the programmable optical network interface engine 66 is implemented as an ASIC with an embedded FPGA. It includes both analog and digital electronic circuits to burst mode transmit, burst mode receive, monitor and recover clock and data, and communicate with the electrical host module 28. These circuits may reside on multiple chips or a single chip. Eventually for cost reduction the preferred embodiment is on a single chip, but the invention is not limited to single chip implementation.

The electrical laser driver and tuning module 68 includes different component circuits for driving the supported laser types. There are a wide variety of different laser types, including but not limited to multisection tunable lasers, fixed wavelength lasers, direct drive lasers and externally modulated lasers. Similarly, the modulator driver and tuning module 74 includes component circuits for driving the supported modulator types. These may include electro-absorption modulators, Mach-Zehnder modulators and direct modulation of lasers. The signals crossing control interface 21 to drive the lasers and modulators may include signals such as a gain drive, mirror drive, phase drive, modulator drive, and control signals for monitoring various optical and electrical properties of the laser.

In one implementation, different types of driver circuits are implemented in module 68 to accommodate many different types of lasers. There may be a bank of different driver circuits. Once the laser for E/O 62 is selected, the corresponding driver circuit is connected. For example, hardware programmable interconnects may be used to connect the correct driver circuit to the output pins on control interface 21 and to the rest of the circuitry within chip(s) 66.

The transmitter and receiver monitor and control module 76 monitors various parameters of the transmitter 62 and receiver 60. Possible parameters include average power, peak power, burst duty cycle, wavelength, average and peak currents for the lasers, average and peak currents for modulator bias circuits, wavelength and power calibration.

The post amplifier and signal conditioner module 78 includes circuits to receive burst mode data, and the signal conditioner module 70 includes circuits to convert the host-side electrical data and clock into signals used to drive the laser and/or modulator circuits, including as required for burst mode transmission. In this specific example, the clock and data recovery (CDR) circuits on the host-side 72 and line-side 80 support burst mode transmission, as described in more detail below. The host-side electronics 28 communicate data 84 to the host-side CDR circuits 72. Recovered clock and data from line-side CDR circuits 80 are delivered to the host module 28 as received data and clock in the required signal level 88.

Control and monitoring of the electronic circuits 66 and the optoelectronic front-end 64 and delivery of control and monitoring signals 86 via the host module are handled by control and monitoring module 82.

As described with respect to module 68, the different modules shown in FIG. 2 may include different types of components (referred to as ONI components for convenience) to accommodate different types of applications and protocols. Once the application and protocol are selected (e.g., by specifying the front-end 64 and host module 28), the chip(s) 66 are hardware programmed accordingly. For example, some of the ONI components in chip(s) 66 may be hardware programmable components (such as FPGAs) which are then programmed to implement the correct functions for the selected application and protocol. Other ONI components may be programmable interconnects, which are then programmed to connect the correct components within ONI engine 66 (and bypassing other components).

For example, in one implementation, different types of driver circuits are implemented in module 68 to accommodate many different types of lasers. There may be a bank of different driver circuits. Once the laser for E/O 62 is selected, the corresponding driver circuit is connected. For example, hardware programmable interconnects may be used to connect the correct driver circuit to the output pins on control interface 21 and to the rest of the circuitry within chip(s) 66.

The specific design of an ONI engine, including the selection of ONI components, will depend on the intended end use(s). More types of components will result in increased flexibility, allowing the same ONI engine to be used across more applications, thus increasing volume and driving down cost. However, this must be balanced against the higher complexity and cost of including more types of components.

In one approach, the ONI engine is designed to address specific types of applications. For example, an ONI engine may be designed to support data center communications. Ethernet, Gigabit Ethernet, ATM, TCP, IP, FDDI, GPON, 10GPON EPON, GBIC, CWDM, WDM PON, DWDM and Fiber Channel are some protocols used in data center communications. Thus, the components on the ONI engine may be selected based on the requirements of this set of protocols (or a subset thereof). Similarly, transport protocols include SONET, SDH, Gigabit Ethernet, ATM, TCP, IP, GBIC, SWDM, WDM PON and DWDM. Protocols for fiber to the home/premise/curb include ATM, TCP, IP, GPON, 10GPON, WDMPON, EPON, Ethernet and Gigabit Ethernet.

The ONI engine may also include media access control (MAC) protocols, forward error correction (FEC) and encryption capabilities, either in hardware form, or programmable in hardware and/or software. Future communications protocols may include pure burst mode communications, including possibly burst switching, generic forms of circuit switching, fast circuit switching, cell based switching, frame based switching and generic forms of packet switching.

The interfaces 21 and 23, and the corresponding signals, will depend on the intended end use(s), and also the division of functionality between the ONI engine 20 and the optoelectronic front-end 14, or between the ONI engine 20 and the host module 28.

The optoelectronic control interface 21 typically will carry current or voltage signals. Current signals can be used for the following purposes: tuning the wavelength of tunable lasers, biasing lasers, wavelength locking and sensing, optical amplifier currents, controlling wavelength and frequency selective elements including filters, reflectors and wavelength or frequency multiplexers and demultiplexers, controlling coherent phase and amplitude, and controlling device temperatures. Voltage signals can be used for the following purposes: controlling voltage controlled optical attenuators (VOAs), controlling optical phase shifters/delays, biasing modulators, and biasing photodiodes. Currents and voltages may also be used to control higher level functions. These are primarily examples where the ONI engine 20 provides a current or voltage to control a component in the optoelectronic front-end 14.

Current and voltages on the optoelectronic front-end 14 can also be sensed, for example to monitor conditions on the optoelectronic front-end 14. This might include the following: monitoring laser sections to determine and control wavelength, phase, power and noise; monitoring optical power, wavelength, amplitude, phase, noise, semiconductor pn junction temperatures, optical amplifier saturation, detector and receiver overload, and detector and receiver saturation.

More advanced functions may include the following: signals to monitor for measuring or estimating of laser, modulator, optical amplifier, detector lifetime and/or aging characteristics, parameters related to burst operation and performance, measurement of bit error and packet or burst error rates, detection of pattern dependent errors, optical performance and channel monitoring including but not limited to optical signal to noise ratio, frequency and phase drift and stability. Additional examples include signals to monitor and control directly laser, modulator and amplifier chirp, laser relative intensity noise and phase noise, and laser mode partition noise. Further examples include signals to measure and estimate receiver, detector, optical amplifier, laser, and modulator performance transient degradation due to burst operation.

In one approach, the components included on the ONI engine may be fairly application-specific: for example a current source for tuning wavelength, another current source for biasing laser, another current source for driving optical amplifiers, etc. The ONI engine is then hardware programmed to connect the appropriate current sources. In another approach, the components on the ONI engine are fairly generic with respect to end application, but may represent different operating characteristics: for example, a current source with a low current output but very low noise, a current source with low output and moderate noise but faster response time, and a current source with higher output. The current sources are then interconnected based on the requirements of the end application. A similar approach may be taken with current and voltage sensors and monitors.

In some designs, the programmable ONI engine 20 is designed to support burst mode transmission of data. Examples of suitable transceivers and transponders are disclosed in co-pending U.S. patent application Ser. No. 12/945,264, "Optical Burst Mode Clock and Data Recovery," filed on Nov. 12, 2010, which is incorporated by reference herein in its entirety. A burst mode receiver preferably is capable of detecting packets that arrive at the receiver asynchronously, i.e. an incoming packet is not bit aligned compared to the previous packet. The burst mode receiver preferably is also able to adjust in real time to incoming packets with different power levels. The inclusion of burst mode capability expands the number of protocols that can be supported by the programmable optical network interface engine 20, including possibly support for future protocols.

As an example of a bursty-traffic environment, a protocol might support variable length, asynchronous packets with small overhead (e.g., short preambles) for clock and data recovery. The arrival time and optical power of the packets or bursts can be random and vary per packet or per burst. In conventional transceivers, stringent requirements are imposed onto the receiver electronics, and in particular on the clock and data recovery (CDR), when synchronous protocols such as SONET, SDH and Gigabit Ethernet are used. These protocols with synchronous clocked data typically require on the order of a couple of thousand transitions to lock, which at 10 Gbps in general means a couple of milliseconds. However, new burst mode applications may have short packets which will require locking of the clock in a much shorter time, for example within approximately 32 bits or less. Thus, a programmable ONI engine 20 that supports burst mode can potentially support these new applications, as well as existing protocols.

One advantage of a design with burst mode capability is that it can operate independent of the data transport or framing protocol over a wide range of data rates. For example legacy frame-based standards can be supported, e.g. EPON, GPON, GBEthernet, in addition to new techniques and evolving standards like optical burst mode and optical packet mode as well as yet undeveloped transport and transmission standards. The optical network interface module accepts raw data that can be bursty in nature with variable packet length over a wide range of packet or burst sizes and a wide range of inter-packet or inter-burst spacing and can support a large optical input power dynamic range. This is very different than current receivers that require some form of coding and framing protocol to guarantee DC balancing and other aspects of the communications channel in order for the receiver to operate properly. The burst mode capability makes it easier to design an programmable ONI engine that can support many protocols and applications.

Chip(s) 66 serve as a common electronic engine that is used for the supported applications, leading to high volume and low cost electronics with burst mode and continuous/framed, protocol and data transparent operation. The electrical host data/clock 84 communicates with programmable ONI engine 66 via an electrical line-side burst-mode transmitter and receiver and host-side burst mode receiver. The host module need only supply data on the host-side. Integration of the host-side burst mode receiver enables the migration to a low cost interface that eliminates costly custom PHY chip sets. The burst mode capability allows many protocols to be communicated to the module for transmission or reception and the ONI module does not need to have its transport protocol fixed in hardware. It can be hardware programmable by the user (or hardware and software programmable), thus making this a hardware programmable optical network interface module.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. For example, the principles described above may be applied to receivers, transmitters and transponders, as well as transceivers.

In alternate embodiments, the invention is implemented in hardware (including FPGAs and ASICs), firmware, software, and/or combinations thereof. The term "module" is not meant to be limited to a specific physical form. Depending on the specific application, modules can be implemented as hardware, firmware, software, and/or combinations of these. In the examples described above, the modules were largely implemented as dedicated circuitry (e.g., part of an ASIC), in order to take advantage of lower power consumption and higher speed. In other applications, the modules can be implemented as software, typically running on digital signal processors or even general-purpose processors. Various combinations can also be used. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. A programmable optical network interface for use in a tunable pluggable optical module, the programmable optical network interface comprising:
    an optical network interface engine which is programmable for use with different types of optoelectronic front-ends and different types of host modules, the host modules being disposed outside the programmable optical network interface,
    wherein the optical network interface engine supports a plurality of transport protocols and a plurality of applications,
    wherein the optical network interface engine includes: a field programmable gate array (FPGA) type circuitry for implementing physical layer functions of the plurality of transport protocols and the plurality of applications, and components for use with the different types of optoelectronic front-ends and the different types of host modules, and
    wherein the optical network interface engine is to be used for the plurality of the applications;
    an optoelectronic control interface for interfacing the optical network interface engine to the different types of optoelectronic front-ends, each optoelectronic front-end including an optical transmitter and an optical receiver, the optoelectronic control interface comprising functionality to interface with the different types of optoelectronic front-ends; and
    a host interface for interfacing the optical network interface engine to the different types of host modules, the host interface comprising functionality to interface with the different types of host modules, wherein the programmable optical network interface is disposed within the tunable pluggable optical module.

2. The programmable optical network interface of claim 1, wherein the optical network interface engine comprises hardware programmable interconnects that can be hardware programmed to interconnect different components within the optical network interface engine.

3. The programmable optical network interface of claim 1, wherein the plurality of transport protocols include a burst mode transport protocol.

4. The programmable optical network interface of claim 1, wherein the plurality of transport protocols include both a burst mode transport protocol and a synchronous transport protocol.

5. The programmable optical network interface of claim 1, wherein the FPGA type circuitry of the optical network interface engine is reprogrammable to implement a transport protocol after the optical network interface engine was manufactured.

6. The programmable optical network interface of claim 1, wherein the plurality of transport protocols include at least one synchronous transport protocol with a date rate of 10 Gbps or higher.

7. The programmable optical network interface of claim 1, further comprising:
    a plurality of different current sources with different operating characteristics, wherein the optical network interface engine is programmable to couple the different current sources to an optoelectronic front-end interface.

8. The programmable optical network interface of claim 1, further comprising:
    a plurality of different voltage sources with different operating characteristics, wherein the optical network interface engine is hardware programmable to couple the different voltage sources to an optoelectronic front-end interface.

9. The programmable optical network interface of claim 1, further comprising:
    a plurality of different current sensors with different operating characteristics, wherein the optical network interface engine is hardware programmable to couple the different current sensors to an optoelectronic front-end interface.

10. The programmable optical network interface of claim 1, further comprising:
    a plurality of different voltage sensors with different operating characteristics, wherein the optical network interface engine is hardware programmable to couple the different voltage sensors to an optoelectronic front-end interface.

11. The programmable optical network interface of claim 1, further comprising:
    a laser driver module for driving at least two different types of lasers.

12. The programmable optical network interface of claim 1, further comprising:
    a modulator module for driving at least two different types of modulation for lasers.

13. The programmable optical network interface of claim 1, further comprising:
    a burst mode clock and data recovery module for supporting the transmission of bursty data.

14. The programmable optical network interface of claim 1, wherein the host modules are configured to implement higher layer functions of a transport protocol.

15. The programmable optical network interface of claim 1, wherein the programmable optical network interface is incorporated into an optical interface network module and the optical interface network module comprises:
    an optoelectronic front-end; and
    a host module.

16. The programmable optical network interface of claim 15, wherein in the optical interface network module, the optoelectronic front-end is selected from the group consisting of a transmitter, a receiver, a transceiver and a transponder.

17. The programmable optical network interface of claim 1, wherein the optoelectronic front-ends comprise photonic integrated circuits.

18. The programmable optical network interface of claim 17, wherein the optoelectronic front-ends comprise multiple optical, optoelectronic or electronic components which are integrated on a common semiconductor substrate or other type of common substrate.

19. The programmable optical network interface of claim 1, wherein the tunable pluggable optical module comprises a small form-factor (SFP) pluggable module.

20. The programmable optical network interface of claim 1, wherein the plurality of applications include applications relating to fiber transmission systems, interconnects, networks and architectures.

21. A programmable optical network interface for use in a tunable pluggable optical module, the programmable optical network interface comprising:
 an optical network interface engine which is programmable for use with different types of electronics front-ends and different types of host modules and to support a plurality of transport protocols or a plurality of applications,
 wherein the optical network interface engine comprises:
 a field programmable gate array (FPGA) type circuitry for implementing physical layer functions of the plurality of transport protocols and the plurality of applications,
 components for use with the different types of optoelectronic front-ends and the different types of host modules, and
 programmable interconnects that can be programmed to interconnect one or more of the different components within the optical network interface engine,
 wherein the optical network interface engine is configured to be used for the different types of optoelectronic front-ends, and
 wherein the plurality of applications are implementable with the optical network interface engine;
 an optoelectronic control interface for interfacing the optical network interface engine to the different types of optoelectronic front-ends, the optoelectronic control interface comprising functionality to interface with the different types of optoelectronic front-ends; and
 a host interface for interfacing the optical network interface engine to the different types of host modules, the host interface comprising functionality to interface with the different types of host modules.

22. A programmable optical network interface for use in a tunable pluggable optical module, the programmable optical network interface comprising:
 an optical network interface engine which is programmable for use with different types of optoelectronic front-ends and different types of host modules and to support a plurality of transport protocols and a plurality of applications,
 wherein the optical network interface engine comprises:
 a field programmable gate array (FPGA) type circuitry for implementing physical layer functions of the plurality of transport protocols and the plurality of applications;
 components for use with the different types of optoelectronic front-ends and the different types of host modules, the components comprising:
  driver circuitry to support driving and monitoring functions for at least two different types of modulators or at least two different types of lasers,
  tuning circuitry for control or monitoring of the at least two different types of modulators or at least two different types of lasers, and
  one or more optical, optoelectronic and electronic components to implement the functions of tuning, bias, monitoring and other control functions of at least two different types of modulators and at least two different types of lasers hardware programmable interconnects that can be programmed to interconnect one or more different components within the optical network interface engine;
 wherein the optical network interface engine is a common engine for the different types of optoelectronic front-ends, and
 wherein the plurality of applications are implementable with the same common engine;
 an optoelectronic control interface for interfacing the optical network interface engine to the different types of optoelectronic front-ends, the optoelectronic control interface comprising functionality to interface with the different types of optoelectronic front-ends; and
 a host interface for interfacing the optical network interface engine to the different types of host modules, the host interface comprising functionality to interface with the different types of host modules.

23. The programmable optical network interface according to claim 22, further comprising clock and data recovery circuits for one or both of host-side and line-side communication.

24. The programmable optical network interface according to claim 22, further comprising components to support a plurality of current or voltage signals, wherein the current or voltage signals are used to control one or more components in the optical network interface or optoelectronic front-end.

25. The programmable optical network interface of claim 24, wherein the components comprise circuitry to sense a current signal, and the current signal is used for one or more functions selected from the group consisting of: tuning the wavelength of a tunable laser, biasing a laser, wavelength locking and sensing, optical amplifier currents, controlling wavelength and frequency selective elements including filters, reflectors and wavelength or frequency multiplexers and demultiplexers, controlling coherent phase and amplitude, and controlling device temperatures.

26. The programmable optical network interface of claim 24, wherein the components comprise circuitry to sense a voltage signal, and the voltage signal is used for one or more functions selected from the group consisting of: controlling a voltage controlled optical attenuator, controlling an optical phase shifter, controlling an optical phase delay, biasing a modulator, and biasing a photodiode.

27. The programmable optical network interface of claim 24, wherein the current or voltage signal is used to control a higher level function.

28. The programmable optical network interface of claim 22, wherein the FPGA type circuitry is configured to implement a specific protocol, and also to implement other signaling, management, control plane or other functions used in networking.

* * * * *